June 8, 1954     K. J. AVERSTEN     2,680,796
ADJUSTING ARRANGEMENT FOR ELECTRIC
WELDING AND SOLDERING GUNS
Filed Nov. 26, 1951

INVENTOR
K.J. Aversten
BY
ATTORNEY

Patented June 8, 1954

2,680,796

UNITED STATES PATENT OFFICE 2,680,796

ADJUSTING ARRANGEMENT FOR ELECTRIC WELDING AND SOLDERING GUNS

Karl J. Aversten, Lidingo, Sweden, assignor to Svenska Aktiebolaget Gasaccumulator, Lidingo, near Stockholm, Sweden, a corporation of Sweden Application November 26, 1951, Serial No. 258,240

Claims priority, application Sweden November 30, 1950

8 Claims. (Cl. 219—4)

The present invention refers to an adjusting arrangement for electric welding and soldering guns of the kind which makes it possible to displace the object, which is to be welded or soldered to a workpiece, by a predetermined length, so as to obtain a suitable length of the welding arc independently of the length of the object, provided the latter remains within certain bounds. For this purpose it is known to provide in the gun a pair of mutually displaceable members, which are constructed so as to be freely displaceable with respect to each other in the one direction but, when displaced in the opposite direction, to interlock, whereby one of the members brings the other along when displaced. A magnetic force is usually employed for pulling the interlocked members the desired length and with them the object to be welded or soldered. The present invention essentially refers to a simple and practical construction, which ensures satisfactory interlocking and consequently the correct value of the length of common displacement of the interlocking members.

In accordance with the invention, one of the mutually displaceable members of the adjusting arrangement is, in order to be able to interlock with the other, pivotable and adapted to interlock with the other member under the influence of a magnetic force occurring in the gun. In accordance with a preferred embodiment a solenoid is disposed within the gun for displacing the members and for swinging the one member into the interlocking position. In accordance with a further embodiment, the other member comprises a pair of opposed contact surfaces disposed along the path of displacement, the first member being disposed between the said contact surfaces and exhibiting a pair of substantially conical outer contact surfaces adapted in response to the said magnetic force to interlock with the said other member irrespective of the position of the said first member.

Figure 1:
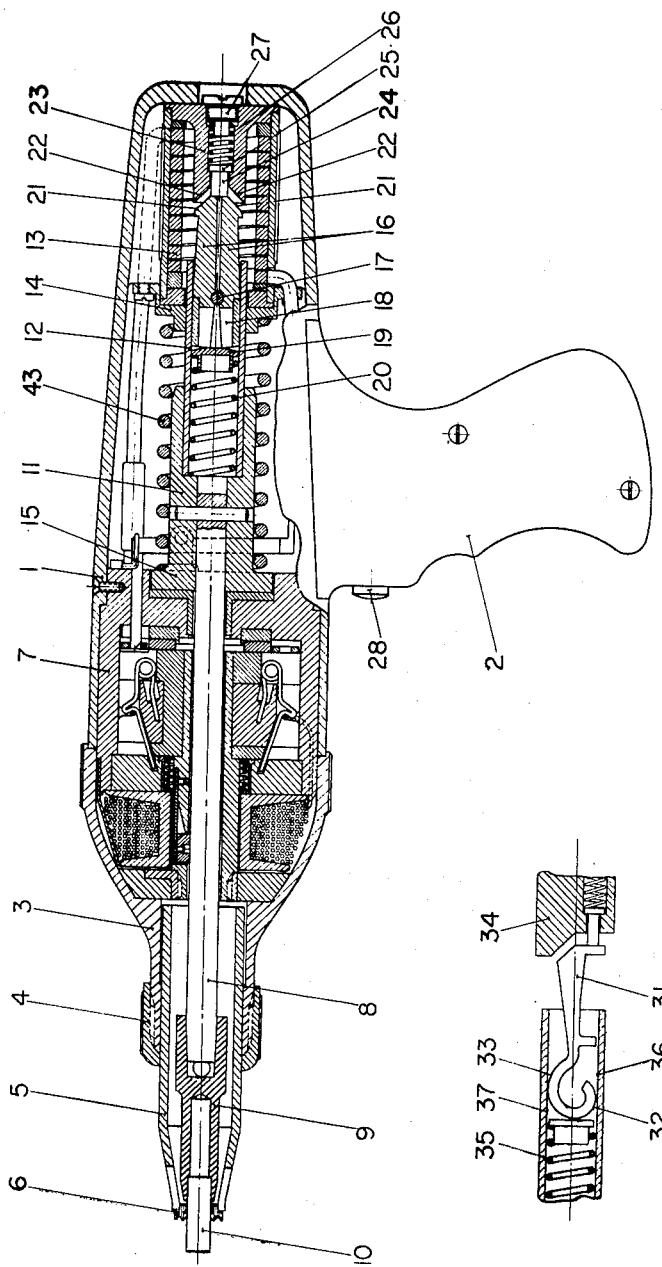
Figure 2:
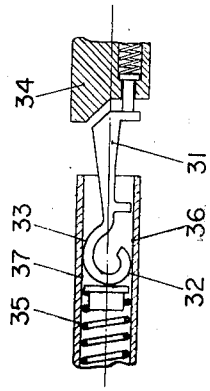

The invention is illustrated by two embodiments thereof shown by way of example on the attached drawing. Fig. 1 is a longitudinal section through a welding and soldering gun with an adjusting arrangement according to the invention. Fig. 2 is a longitudinal section of a modified adjusting arrangement.

In accordance with the embodiment shown in Fig. 1, the housing 1 of a welding gun is of circular contour along its entire length except at the place of the handle 2 of the gun. One end 3 of the housing forms a part of a conical tube junction, the other part of which comprises a nut 4. A supporting sleeve 5 extends through the junction 3, 4 and tapers off towards its external end, where a porcelain collar 6 is removably attached.

Within the housing there is secured an insulating body 7, through which an axle 8 extends centrally. A chuck 9 is attached to the axle 8 and in it is secured a stud 10 to be attached by welding or soldering to a workpiece.

The internal end of the axle 8 carries an extension 11 with a tube 12 secured therein and extending towards and somewhat into a solenoid 13. A helical spring 43 is disposed around the extension 11 and the tube 12 and rests with one of its ends against a support 14 within the housing and with its other end against a flange 15 of the extension, whereby the extension is pressed against the insulating body as shown in Fig. 1.

The tube 12 accommodates a locking member comprising a pair of levers 16 of iron or other magnetic material and a pivot 17 as well as a guide 18 attached to each lever. The levers have been obtained from a body comprising a flat circular portion and a slightly conical portion in which a bore is provided for the stud 17 at the base of the cone, whereupon the body is cut up lengthwise into two halves. The entire locking member is free to slide within the tube 12. A shoe 19 rests against the guides 18 under the action of a spring 20, which thus strives to push the locking member 16 to 18 out of the tube 12.

The outer ends of the levers 16 are provided with contact surfaces 21, which are inclined with regard to the direction of movement of the levers, i. e. the longitudinal direction of the tube, and are adapted to cooperate with similar inclined contact surfaces 22 of an iron core 23 inserted in the outer end of the solenoid 13. A pin 24 is disposed centrally in the iron core 23 and extends somewhat beyond the adjacent portions of the contact surfaces 22 under the influence of a spring 26 disposed between the pin 24 and a screw plug 27. A flange 25 on the pin 24 serves to limit the outward displacement of the pin 24.

The remaining details of the welding gun are unessential to the invention.

When it is desired to weld a stud 10 to a workpiece, the stud is inserted into the chuck and the sleeve 5 is fixed by means of the coupling device 3, 4 in a suitable extended position, so that the porcelain collar 6 will be a short distance inwards of the outer end surface of the stud 10, as shown in Fig. 1. The gun is held so as to place the stud 10 in the desired position on the work and the porcelain collar 6 is advanced towards the work by the weight of the gun or by hand. This implies that the stud 10 is pushed into the gun until its outer end surface coincides with that of the porcelain collar. By this action the chuck 9, the pushed inwards, i. e. to the right in Fig. 1 and axle 8, the extension 11 and the tube 12 are also the spring 43 is correspondingly compressed. An interstice will thus be formed between the left hand end surface of the extension 11 in Fig. 1 and the adjacent part of the insulating body 7.

The locking member is not displaced during the above displacement of the tube 12 but remains at rest against the extended pin 24, 25, as shown in Fig. 1, owing to the fact that the pressure of the spring 26 exceeds that of the spring 20. Current is then applied to the solenoid 13 by the closing of a contact by means of a button 28 in the handle 2. The magnetic force thereby developed in the core 23 and its contact surfaces 22 strives to separate the contact surfaces 21. The levers 16 then swing slightly outwards about the pivot 17 and their cylindrical base sections are pressed and locked against the inside of the tube 12. Under the continued influence of the magnetic force the iron core 23 attracts the locking member 16 to 18, making the contact surfaces 21 and 22 abut. The pin 24 is then pushed into the core, as the force of the spring 26 exceeds that of the spring 20 by an amount that is smaller than the magnetic force.

The said displacement of the locking member 16 to 18 to the right, as viewed in Fig. 1 is thus shared by the tube 12, and, with it, by the extension 11, the axle 8, the chuck 9 and the stud 10. Since current is applied to the stud 10 at the same time as to the solenoid 13, an arc will form between the stud 10 and the work and the outer end of the stud will melt. After a short interval the supply of current is interrupted and the magnetic action disappears. The heavy spring 43 immediately displaces the extension 11 towards the insulating body 7 and this displacement is shared by the axle 8, the chuck 9 and the stud 10 in the outward direction relative to the gun. As a consequence, the melted outer end of the stud is pressed against the work and becomes firmly fixed to it when the molten pool formed round the end of the stud has solidified.

It will be immediately apparent that the locking member 16 to 18 will interlock with the tube 12 in the manner described, irrespective of the position of the member in the tube, and that it will always be attracted to move the same distance, this being the distance between the contact surfaces 21 and 22, as determined by the pin 24. Therefore, the stud 10 will always be lifted an equal distance away from the work and the correct length of arc and the good quality of the weld accruing therefrom will be assured independently of the length of stud protruding beyond the porcelain collar prior to the application of the gun to the work. This presupposes, of course, that there is sufficient room for the displacement of the locking member in the tube 12. The locking member releases its hold of the tube as soon as the magnetic force disappears and the shoe 19 may also contribute to some extent to the swinging apart of the guides 18 with a consequent swinging-in of the levers 16, whereby the latter disengage the tube and the locking member is brought or held in abutting relation to the pin 24. The adjusting arrangement is then prepared for the welding of a following stud.

The amount by which the stud is lifted away from the work is thus determined by the length of the pin 24 and the position of the shoulder of the core 23 cooperating with the flange 25 and may easily be changed through an exchange of the pin 24. The shouldered portion of the iron core may also comprise a sleeve, which is adjustable axially in the core and is accessible from the outside of the gun so as to make possible convenient adjustment of the axial position of the sleeve.

In accordance with the embodiment shown in Fig. 2, the locking member has substantially the shape of a hook with a pair of opposite contact surfaces 32 and 33 having an increasing distance therebetween. That is, one surface, such as the surface 32, may be slightly rounded, so that if the right-hand end of the locking member swings upward, as viewed in Fig. 2, under the influence of the magnetic force from the iron core 34, the surface 32 rocks on one elongated contact surface 36 of the extension or tube 35. The other surface, 33, should then be eccentric, so as to lock with the other elongated contact surface 37 of the tube 35 during the swinging of the locking member. The surfaces 36 and 37 need not form parts of a cylindrical surface. They may, for instance, comprise a pair of opposing plane walls of sufficient length disposed within the tube 35. The locking member proper may therefore have a variety of different shapes.

What I claim is:

1. An adjusting arrangement for electric welding and soldering guns comprising, a housing, means for holding the object to be welded, and slidable with respect to said housing, pivotally mounted interlocking means engageable with said holding means and slidable in said housing, electromagnetic means mounted to said housing and associated with said interlocking means by electromagnetic force when energized to pivot said interlocking means into interlocking engagement with said holding means and to displace said two interlocked means toward the end of said gun remote from said object to be welded, said holding means including a pair of opposed contact surfaces disposed along the path of displacement, said interlocking means being disposed between the said contact surfaces and having a pair of outer contact surfaces adapted in response to the said magnetic force to interlock with the said holding means irrespective of its position relative to said interlocking means.

2. An arrangement as claimed in claim 1, in which said solenoid includes an iron core disposed therein, and the said opposed contact surfaces are disposed parallel to the axis of the solenoid, the said interlocking means extending centrally in the solenoid into the proximity of said iron core.

3. An arrangement as claimed in claim 2, in which the said opposed contact surfaces are comprised by the inside of a tube and the said outer contact surfaces by the outsides of a pair of substantially semi-cylindrical members, which are mutually pivotable on an axle at right angles to the said tube.

4. An arrangement as claimed in claim 3, in which a spring is disposed within the said tube and adapted to displace the said interlocking means out of the said tube and towards the core of the solenoid.

5. An arrangement as claimed in claim 4, in which a pin is disposed in the said iron core extending a short distance outside thereof and forming a stop for the said interlocking means, the said pin being plungeable into the core against the action of a spring.

6. An arrangement as claimed in claim 1, in which the said pivotable interlocking means is provided with an end surface facing towards the solenoid and inclined relative to the direction of displacement of said interlocking means.

7. An arrangement as claimed in claim 6, in which said solenoid includes an iron core provided with an end surface facing towards the said interlocking means and substantially parallel with the end surface thereof.

8. An arrangement as claimed in claim 1, in which a sleeve surrounds the object to be welded or soldered and rests against a ferrule mounted in the end of said sleeve around the object to be welded so as to be able to rest against the workpiece, said sleeve being axially adjustable to the gun housing, whereby a preadjustment of the initial relative mutual positions of the interlocking means and holding means is possible.

References Cited in the file of this patent

UNITED STATES PATENTS

| Number | Name | Date |
|---|---|---|
| 2,191,494 | Nelson | Feb. 27, 1940 |
| 2,413,139 | Nelson | Dec. 24, 1946 |
| 2,451,152 | Candy | Oct. 12, 1948 |
| 2,467,723 | Barlow | Apr. 19, 1949 |

FOREIGN PATENTS

| Number | Country | Date |
|---|---|---|
| 601,567 | Great Britain | May 7, 1948 |